(12) United States Patent
Novak et al.

(10) Patent No.: US 8,813,170 B2
(45) Date of Patent: Aug. 19, 2014

(54) TESTING ACCESS POLICIES

(75) Inventors: Mark F. Novak, Newcastle, WA (US);
Paul Leach, Seattle, WA (US); Vishal Agarwal, Bothell, WA (US); David McPherson, Bothell, WA (US); Sunil Gottumukkala, Redmond, WA (US);
Jignesh Shah, Redmond, WA (US);
Arun K. Nanda, Sammamish, WA (US);
Nir Ben Zvi, Redmond, WA (US);
Pranav Kukreja, Bellevue, WA (US);
Ramaswamy Ranganathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/294,162

(22) Filed: Nov. 10, 2011

(65) Prior Publication Data
US 2013/0125199 A1 May 16, 2013

(51) Int. Cl.
*G06F 17/00* (2006.01)
(52) U.S. Cl.
USPC .............................. 726/1; 709/207; 702/183
(58) Field of Classification Search
None
See application file for complete search history.

(56) References Cited

U.S. PATENT DOCUMENTS

| | | | |
|---|---|---|---|
| 7,260,503 B2 * | 8/2007 | Stobie et al. | 702/183 |
| 7,350,226 B2 | 3/2008 | Moriconi et al. | |
| 7,685,632 B2 | 3/2010 | Vayman | |
| 7,739,720 B2 | 6/2010 | Samuelsson et al. | |
| 7,975,286 B1 * | 7/2011 | Fickey et al. | 726/1 |
| 8,214,193 B2 * | 7/2012 | Chawla et al. | 703/22 |
| 2005/0283823 A1 | 12/2005 | Okajo et al. | |
| 2007/0056019 A1 | 3/2007 | Allen et al. | |
| 2008/0066147 A1 | 3/2008 | Dillaway et al. | |
| 2009/0222882 A1 | 9/2009 | Kabat et al. | |
| 2010/0138897 A1 * | 6/2010 | Bezilla et al. | 726/1 |
| 2011/0247048 A1 * | 10/2011 | Gill et al. | 726/1 |

OTHER PUBLICATIONS

Chow, et al., "Modeling complex access control policies in distributed systems", Retrieved at <<http://ieeexplore.ieee.org/xpl/freeabs_all.jsp?arnumber=525010>>, Proceedings of the 5th IEEE Workshop on Future Trends of Distributed Computing Systems, Aug. 28-30, 1995, pp. 404-411.

Tilak, et al., "Composing Access Control Policies of Distributed Components", Retrieved at <<http://ieeexplore.ieee.org/xpl/freeabs_all.jsp?arnumber=4030896>>, 2nd IEEE International Symposium on Dependable, Autonomic and Secure Computing, Sep. 29-Oct. 1, 2006, pp. 301-307.

(Continued)

*Primary Examiner* — Fikremariam A Yalew
(74) *Attorney, Agent, or Firm* — Timothy Churna; Andrew Sanders; Micky Minhas (57) ABSTRACT

A policy that governs access to a resource may be tested against real-world access requests before being used to control access to the resource. In one example, access to a resource is governed by a policy, referred to as an effective policy. When the policy is to be modified or replaced, the modification or replacement may become a test policy. When a request is made to access the resource, the request may be evaluated under both the effective policy and the test policy. Whether access is granted is determined under the effective policy, but the decision that would be made under the test policy is noted, and may be logged. If the test policy is determined to behave acceptably when confronted with real-world access requests, then the current effective policy may be replaced with the test policy.

20 Claims, 4 Drawing Sheets

(56) References Cited

OTHER PUBLICATIONS

Mohan, et al., "An Attribute-based Authorization Policy Framework with Dynamic Conflict Resolution", Retrieved at <<http://middleware.internet2.edu/idtrust/2010/papers/03-mohan-attribute-authorization-policy.pdf>>, Proceedings of the 9th Symposium on Identity and Trust on the Internet, Apr. 13-15, 2010, pp. 37-50.

Sloman, et al., "SecPol: Specification and Analysis of Security Policy for Distributed Systems", Retrieved at <<http://www-dse.doc.ic.ac.uk/Projects/secpol/SecPol-overview.html>>, Dated: Feb. 1999, retrieved on: Mar. 29, 2011, 10 pages.

* cited by examiner

TESTING ACCESS POLICIES

BACKGROUND

Access to resources may be controlled by a policy, which determines whether a given request to access a resource may be granted. When a request to access a resource is made, the request is evaluated against the policy. If, based on the evaluation, it is determined that the request is allowable, then the requested access is granted; otherwise it is denied.

As computing systems and environments grow more complex, the policies that govern access to the resources have become increasingly complex as well. A policy may determine who or what can access a very large number of resources, and may depend on complex, intertwined factors. Thus, it is often difficult to predict the effect of a given policy, and the cost of an error in the policy (the prospect of accidentally granting access to the wrong principals, or denying access to legitimate principals) is very high. Even minor changes to existing policies can have far-reaching effects that are hard to predict at the time the policy change is made.

SUMMARY

Policies may be tested before they are deployed, in order to determine whether the policies will produce their intended effect. In one example, a policy governs access to a resource, and an administrator wants to change that policy. The administrator may create a new policy, and may cause the new policy to be evaluated along with the current policy as a test. When a request to access a resource is made, the request is evaluated under both the current policy and the new policy that is being tested. The actual decision as to whether to grant access to the resource may be made under the current policy rather than the test policy. However, the results of the evaluation under the test policy may be recorded, in order to determine whether the access request would be granted or denied if the test policy had actually been in force. In other words, the effect of a new policy can be tested against real-world access requests during a trial period, during which the new policy is not actually used to control access to a resource. If sufficient data on the test policy's behavior is collected, and if that data indicates that the policy will behave as expected, then the current policy may be replaced with the new policy. When the current policy is replaced with the new policy, future access decisions are made under the new policy.

When an access request is evaluated under both current and test policies, the resulting evaluation may be recorded in various ways. In one example, each request is logged. In another example, each request in which the test policy produces results different from the current policy is logged. One variation on this logging scheme is to log some percentage of evaluations, or to log the evaluations until some specific amount of data is collected. The log may be reported to an administrator, who may use the log to decide whether to replace the current policy with the test policy. Or, the change to the test policy may be made automatically if the divergence in behavior between the test policy and the current policy exceeds (or stays within) some limit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Access to resources may be controlled by a policy. When a request is made to access a resource, a determination may be made as to what policy or policies apply to the resource. Once the applicable policy or policies have been identified, the request may be evaluated against those policies. If the policy (or a conjunctive or disjunctive combination of the policies) allows the resource to be accessed, then the access request may be granted. Otherwise, the request may be denied.

Early access control systems were relatively simple—e.g., each file or other resource was typically labeled with the names of the principals or groups who could access the resource. In such a system, understanding the effect of a policy is relatively simple. For example, if the policy says "Joe can read/write the resource, and the Accounting group can read the resource," then it is relatively straightforward to understand which access requests will be granted, and which ones will be denied. However, as computing environments, and the relationships among principals, grow increasingly complex, so do the access policies governing resources. In many cases, the policy (or combination of policies) that governs access to a resource is sufficiently complex that it is difficult to predict how the policy will behave in a wide variety of circumstances. Moreover, a seemingly small change to a policy may have far-reaching and unexpected effects on which access requests are granted and which ones are denied. Thus, making untested policy changes can be risky because the effects of the changes are hard to predict.

The subject matter described herein provides techniques for testing policies in real-world situations before the policies are actually used to govern access to resources. When an effective policy is to be changed, a test policy may be associated with the effective policy. When an access request is made for a resource that is governed by the effective policy, the request may be evaluated both under the effective policy and the test policy. The actual access decision that is given in response to the request is based on the result of the evaluation under the effective policy. However, the result of the evaluation under the test policy is determined, and may be logged. The results of evaluating various requests under both the effective and test policies, and any differences between those results, may indicate how the test policy will behave, and what changes in access will results when the policy that is being tested eventually replaces the current effective policy.

It is noted that some access control systems may evaluate plural effective policies in response to an access request. However, it is noted that a system that evaluates both an effective policy and a test policy (e.g., a not-yet-effective policy) is not merely an obvious variant of systems that evaluate plural effective policies. In systems that merely evaluate plural effective policies in response to an access request, the various policies may contribute to the actual decision on the access request. By contrast, when a test policy is evaluated in response to an access request, the result of the test policy typically does not contribute to the actual access decision being made (and may not have contributed to any access decision on any resource, up to this point), but rather may be used to determine whether the test policy is to be deployed in the future as an effective policy.

Figure 1:
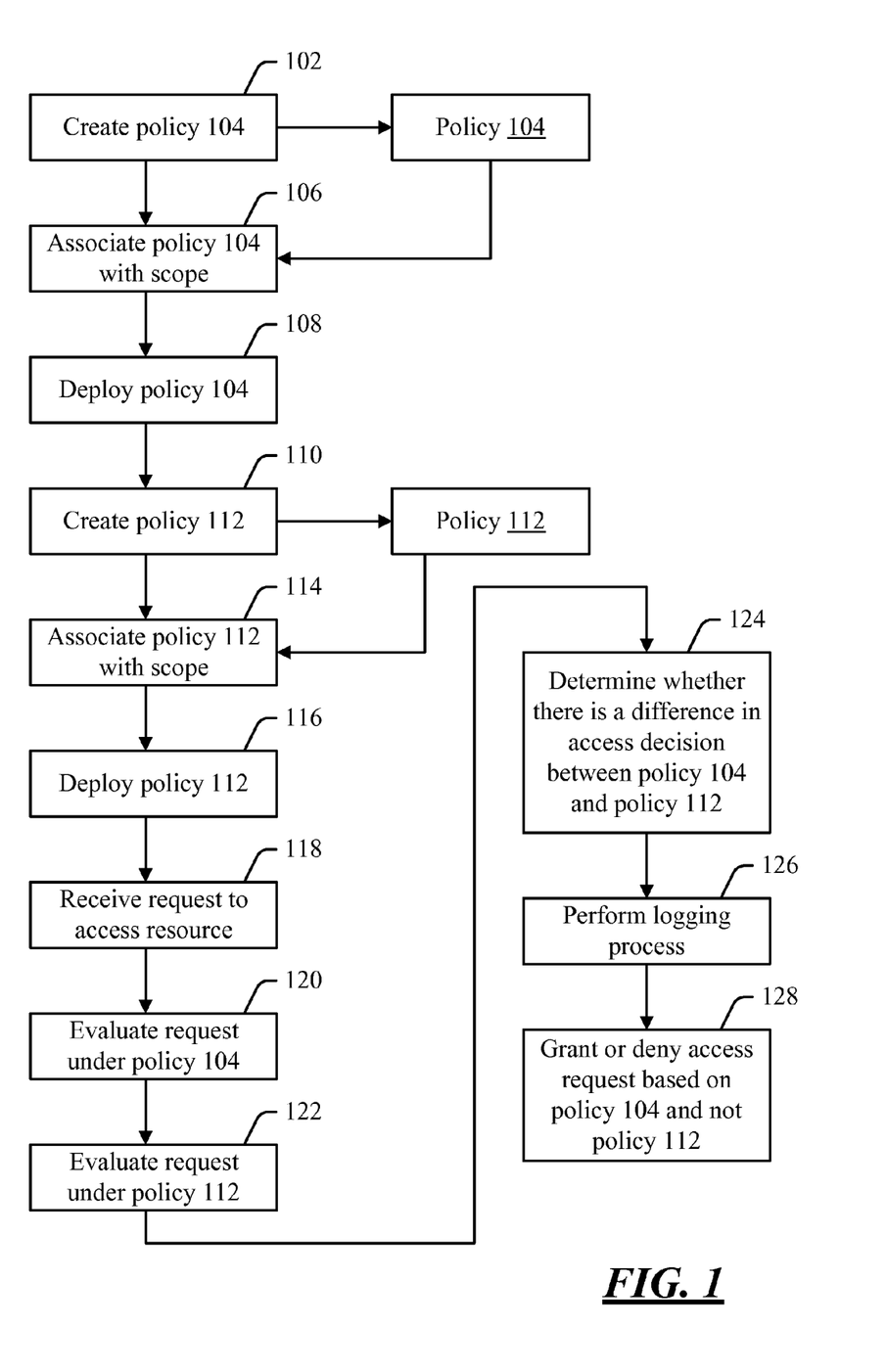
FIG. 1 is a flow diagram of an example process in which a policy may be tested.

Turning now to the drawings, FIG. 1 shows an example process in which a policy may be tested. Before turning to a description of FIG. 1, it is noted that each of the flow diagrams contained herein (both in FIG. 1 and in FIG. 2) shows an example in which stages of a process are carried out in a particular order, as indicated by the lines connecting the blocks, but the various stages shown in these diagrams can be performed in any order, or in any combination or sub-combination.

At 102, policy 104 is created. Policy 104 may specific the conditions under which access to a resource may be granted. For example, policy 104 may specify the type of access that may be granted, the classes of principals for which access may be granted, the dates and/or times during which access may be granted, the types of machines on which access may be granted, limitations on the types of networks though which access may be sought, delegation rules concerning which principals may grant access to other principals, or any other conditions that govern the decision as to whether to grant access to resources. Additionally, policy 104 may implicitly or explicitly specify the category of resources to which access is to be granted, as discussed in greater detail below.

At 106, policy 104 may be associated with a particular scope. A scope defines a collection of resources, and may be defined in any manner. In one example, a scope is simply an arbitrary list of resources that fall within the scope. In another example, a scope is defined in more general terms—e.g., the set of resources in a particular folder, the set of resources on a particular machine, the set of resources whose names match the regular expression "[abcdef][a-z0-9]*\.txt", or any other way of defining a set of resources. Associating a policy with a scope declares that the policy applies to those resources within the scope. It is noted that part of the applicability decision may be part of the policy itself. For example, a scope might include all resources whose names begin with the letter A-F, but a policy associated with that scope might contain rules that—in effect—make the policy applicable only to resources whose names begin with the letter A. (It is noted that, in practice, many of the policy changes that can be tested using the techniques described herein relate to applicability decisions that are part of the policy. However, the subject matter herein is not limited to changes that affect applicability decisions.)

At 108, policy 104 may be deployed. When a policy is deployed, access requests for resources within the policy's associated scope are evaluated against the policy. To say that a policy has been deployed does not necessarily imply that the policy is an effective policy. Both effective policies and test policies can be deployed in the sense that both such policies can be evaluated when access is sought to resources that fall within the deployed policies' scope. (In the example of FIG. 1, policy 104 may be considered an effective policy, and policy 112 (discussed below) may be considered a test policy.)

At 110, policy 112 is created. Policy 112 may be a new policy that is unrelated to policy 104, or may be a changed version of policy 104. As noted above, policy 112 may differ from policy 104 in the way that policies 112 and 104 define applicability, although policies 104 and 112 could differ from each other in any manner. At 114, policy 112 is associated with a scope. In one example, the scope with which policy 112 is associated is the same scope as policy 104 was associated with at 106. At 116, policy 112 is deployed.

At 118, a request may be received to access a resource, where the resource is within a scope associated with policies 104 and 112. The request may then be evaluated under policies 104 and 112 (at 120 and 122, respectively). It is noted that the test might not be run on all of the machines. For example, an organization might have a plurality of machines, but might not want to impact performance at all of the machines by evaluating both effective and test policies. Therefore, the organization might choose a subset of the plurality of machines as being the machines on which the test will be performed. Then, when a request arises, it could be determined whether the machine one which the request is made is one of the machines in the chosen subset. If it is, then the test policy is evaluated; otherwise, the test policy is not evaluated. At 124, it is determined whether there is a difference in the decisions made under policies 104 and 112. For example, the determination made under policy 104 might be that access is allowed, while the determination made under policy 112 might be that access is denied. Or, the determination made under policy 104 might be that that policy 104 applies to the resource in question and that access is allowed, while the determination under policy 112 might be that policy 112 does not apply to the resource in question. Or, as another example, policy 104 might allow read/write access to the resource, while policy 112 might allow only read access. The foregoing are some non-limiting examples of situations where the access decisions under policies 104 and 112 are different from each other. On the other hand, if both of policies 104 and 112 apply to the resource in question and both allow access to that resource, then this would be an example of a situation where there is no difference in the access decision.

At 126, a logging process is performed based on the determination that was made at 124. The logging process creates a log that reflects the results of comparisons of decisions made under policies 104 and 112. The actual items that are included in the log may vary, depending on the nature of the logging process that is used. In one example, a log entry may be created every time that evaluations are made under policies 104 and 112. In another example, some percentage of evaluations (or the requests that triggered those evaluations) are logged. In another example, evaluations that come out differently under the two policies (or some percentage of evaluations that come out differently) are logged. The foregoing are some examples of how a logging process may work, although the subject matter herein includes any appropriate way of determining what types of events to log. Additional details of the logging process, and how it may be determined which events to include in a log, are described below in connection with FIG. 2.

The log, once it is created, indicates differences in access decision that result from evaluating the same access request under policies 104 and 112. The log may be used to determine whether to make the test policy an effective policy, or whether to modify such a policy and to allow the policy to undergo further testing.

After the evaluation of the access request is made under policies 104 and 112, the requested access to the resource may be granted or denied (at 128). The decision as to whether to allow access may be based on policy 104 and not based on policy 112. As noted above, in one example policy 104 is the currently effective policy and policy 112 is the test policy. Thus, in the example process of FIG. 1, policy 112 is tested against real-world access requests, and the results of applying the test policy to real-world access requests is recorded in a log so that those results can be analyzed before policy 112 is actually used to grant or deny access request.

Figure 2:
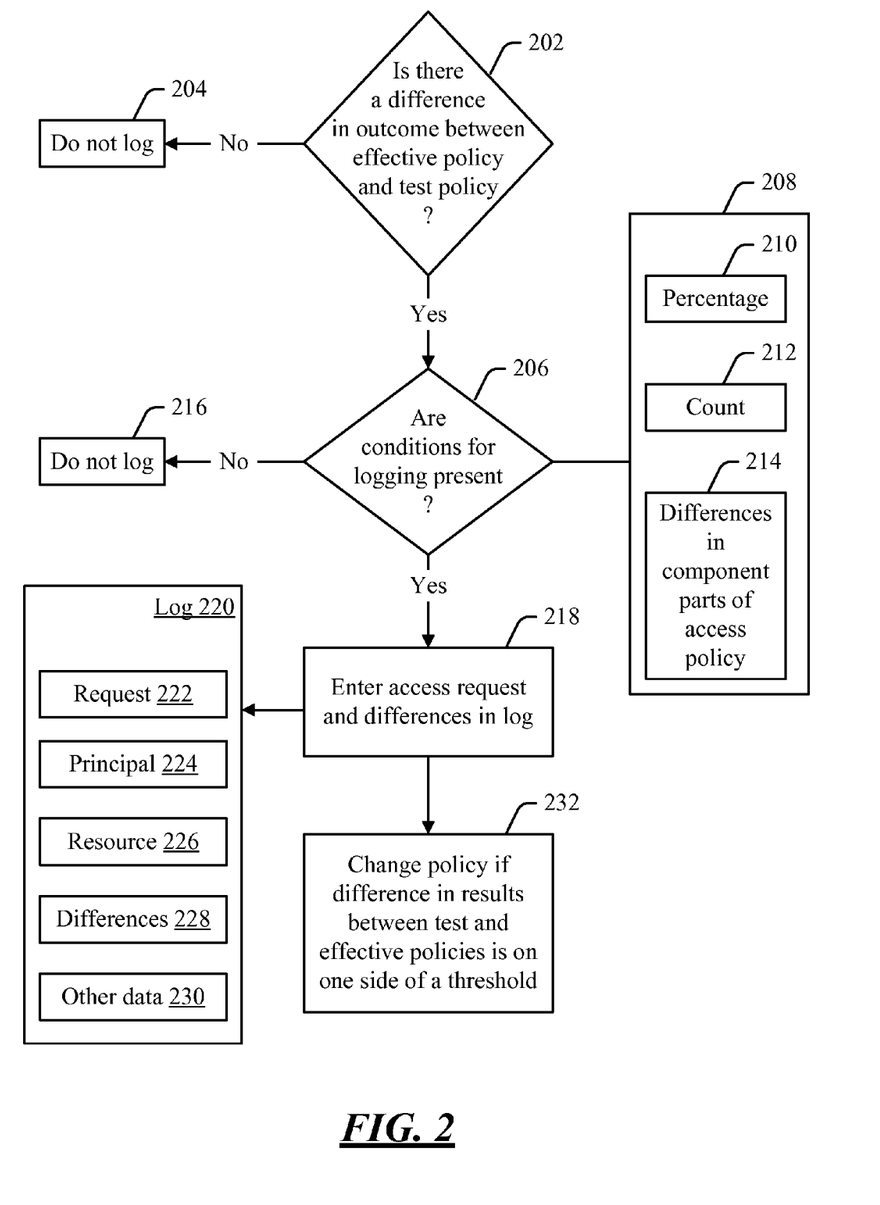
FIG. 2 is a flow diagram of an example logging process.

FIG. 2 shows an example logging process. The logging process at 126 of FIG. 1 may be performed using actions shown in FIG. 2, but could be performed by any appropriate process.

The input to the process of FIG. 2 may be the decisions that are made under the test policy and under the effective policy, in response to an access request. At 202, it is determined whether there is a difference in the outcome of the decisions between the test policy and the effective policy. For example, if access is allowed under the test policy and denied under the effective policy, this result represents a difference in the outcomes. On the other hand, if both policies allow access, or both policies deny access, then it may be determined that there is no difference in outcome. If there is no difference in the outcomes, then the process may determine not to log the outcomes (at 204).

If there is a difference in the outcomes, then the process continues to 206 to determine whether the conditions for logging are present. There are different variations of the process shown in FIG. 2, and each such variation may have its own set of circumstances under which differences in outcome between the test and effective policies are logged. In one example, every such difference is logged, in which case the conditions for logging are present whenever a difference in outcome exists. However, there are other example conditions 208, which are discussed below.

One example condition 210 is that only a percentage of different outcomes are logged. For example, in order to avoid creating an unmanageably large log, a system might choose, for example, to log only 50% (or 25%, or 10%, etc.) of the events in which the test and effective policies had different outcomes. Such a system might choose the events to be logged in a regular pattern (e.g., logging alternate events, in the case where 50% of the events are to be logged), or might choose the events to be logged at random (e.g., selecting a random integer, and logging the event if the chosen integer is even). In this example, the conditions for logging are present in some percentage of cases (but not all cases) where the effective and test policies have different outcomes.

Another example condition 212 uses a count of logged events, where the logging is stopped after a certain number of events have been logged. For example, a system might choose to log the first n events (e.g., the first 500 events), and might stop logging after n events have been logged. In this example, the conditions for logging are present if n−1 or fewer events have already been logged.

Another example condition 214 is based on whether there are differences in the component parts of the test and effective policies, even if the actual outcome of the policies remains the same. For example, a policy might be the disjunction of two components, such that the policy allows access if either one of the components evaluates to true. Thus, if the test and effective policies are composed of components A and B, it might be the case that A evaluates to true and B evaluates to false under the effective policy, and that A evaluates to false and B evaluates to true under the test policy. In both cases, the disjunction "A or B" evaluates to true, thereby allowing access under both the test and effective policies. However, the fact that the truth values of the individual components A and B are different under the test and effective policies might be noteworthy even if the outcome that is based on their disjunction does not change. Thus, if a policy is made of components, and if the individual components of the policy produce different results, then the conditions for logging may be present.

Regardless of what conditions would justify logging, if those conditions are not present, then the outcomes are not logged (at 216). If the conditions for logging are present, then at 218 the access request—and the differences in outcome between the test and effective policies—are entered into log 220.

Log 220 may record various types of information for each loggable event. Some example types of information are shown. These example types of information may include the access request 222 that was made, the principal 224 who made the request, the resource 226 for which access was requested, differences 228 between the test and effective policies, and any other data 230. With regard to differences 228, it may be the case that an event is logged when one policy grants access and the other policy denies access, in which case the existence and nature of the difference is implied by the very fact that a log entry exists. However, as noted above, in some cases the difference is not in the final outcome, but rather in the individual components that are used to reach that outcome. In the example noted above, a policy that is a disjunctive combination of two components, A and B, might allow access if either A or B is true. Thus, if the effective policy results in A=true and B=false, and the test policy results in A=false and B=true, then the actual access decision is the same under both the test and effective policies, but this difference in the individual component results might be entered in the log as one of differences 228, so that this aspect of the difference between the test and effective policies can later be analyzed.

The process describes above may be performed for many access requests, thereby creating a log of differences between the test and effective policies that can be used to determine whether to replace the effective policy with the test policy. Thus, in one example, at 232 the effective policy is changed to the test policy if the quantity of differences between the two policies (as reflected in log 220) is on one side of a threshold. The notion of the quantity of differences being "on one side of a threshold" includes the case where the policy is changed if the differences exceed some amount, and also include the case where the policy is changed if the differences are less than some amount. In some cases, one might want to change the policy only if the change is sufficiently small (e.g., if there are fewer than 500 differences between the test and effective policies over the course of a day, or if fewer than 10% of access requests produce a different result). In another case, one might change the policy only if the change is sufficiently large (e.g., if there are more than 1000 differences between the test and effective policies over the course of a day, of if policy results in more than 25% of access requests to change). To say that the quantity of differences are on "one side of a threshold" includes either case. The change may take place automatically, or may be directed by an administrator.

As noted above, FIG. 3 shows an example scenario in which an authorization policy is used to govern access to a resource.

Figure 3:
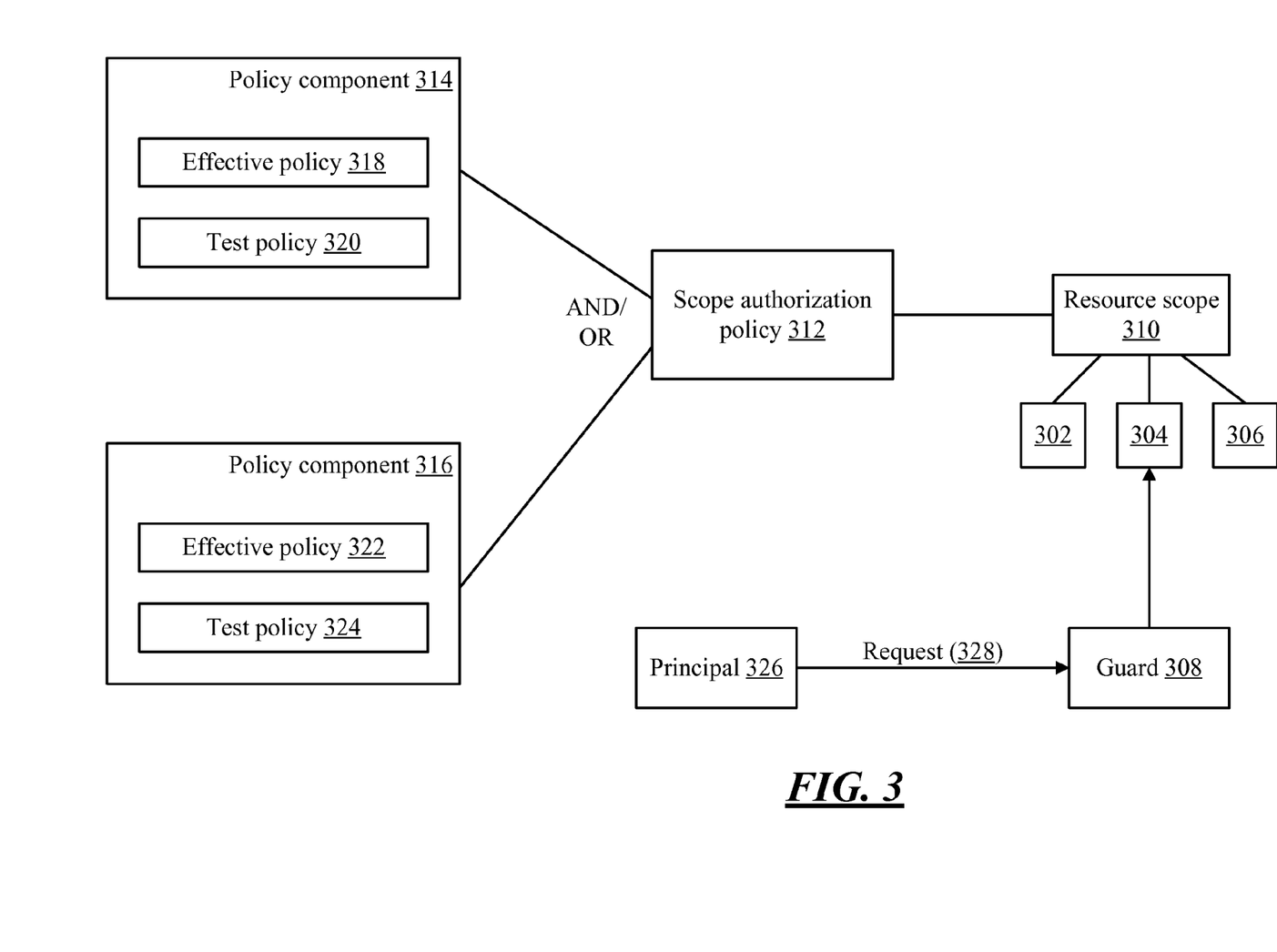
FIG. 3 is a block diagram of an example scenario in which an authorization policy is used to govern access to a resource.

In the example of FIG. 3, access to several resources 302, 304, and 306 is controlled by guard 308. Resources 302-306 fall within resource scope 310, where resource scope 310 is a collection of one or more resources that can be grouped together for the purpose of applying a policy. Resource scope 310 can be defined in any appropriate way—e.g., as an arbitrary list of resources, or by some general classification (e.g., all files whose names begin with the letter "a", all files in a particular folder, all files belonging to the accounting group, etc.).

Resource scope 310 is associated with a scope authorization policy 312. Scope authorization policy 312 is a policy that defines the circumstances under which a resource within resource scope 310 may be accessed. (The set of circumstances may be defined based on any factors, or combination of factors—e.g., the particular principal who accesses the resource, the type of access sought (e.g., read or write access), the type of machine from which access is sought, the date, the time, or any other appropriate factor(s) may constitute the conditions under which access is sought.) Scope authorization policy 312, in one example, may be composed of several component policies, which may be applied conjunctively or disjunctively. In the example of FIG. 3, scope authorization policy 312 is composed of policy components 314 and 316. These policy components may be combined conjunctively (by a Boolean AND) or disjunctively (by a Boolean OR), or in any other appropriate manner. For example, policy component 314 might have a truth value (e.g., true=grant access; false=deny access) based on one set of conditions related to a given access request, and policy component 316 may have a different truth value based on a different set of conditions related to the access request. The final decision on access that is made by scope authorization policy 312 may be the conjunction or disjunction of these separate truth values. For example, for a given access request, policy component 314 might evaluate to true, and policy component 316 might evaluate to false. If scope authorization policy 312 is the conjunction of these two policy components, then the scope authorization policy evaluates to false (because true AND false=false). If scope authorization policy 312 is the disjunction of these two policy components, then the scope authorization policy evaluates to true (because true OR false=true). It is noted that the idea of a scope authorization policy being based on a combination of policy components is an optional feature; a scope authorization policy could be defined in other ways that do not involve the combination of other components.

Policy components 314 and 316 may have both effective and test policies. In the example shown, policy component 314 has effective policy 318 and test policy 320, and policy component 316 has effective policy 322 and test policy 324. As described above, the effective policy is the policy that is presently being used to decide access, and the test policy is a policy against which access requests may be judged for test purposes, but that do not contribute to actual access decisions while the test policies are being tested.

At some point in time, principal 326 makes request 328 to guard 308. Request 328 seeks access to one of the resources 302-306 that are within resource scope 310. In the example shown, the resource to which access is sought is resource 304. Since resource 304 is within resource scope 310, guard 308 accesses the scope authorization policy 312 that is associated with resource scope 310, and evaluates that policy under the conditions in which access is sought. In the example shown, scope authorization policy 312 is based on a combination of policy components 314 and 316, so the request is evaluated under those policy components in order to determine whether access is granted.

As noted above, policy components 314 and 316 include both effective policies and test policies. Thus, four separate policy evaluations are made. In particular, evaluations of the request are made under effective policy 318, test policy 320, effective policy 322, and test policy 324. The resulting evaluations of effective policies 318 and 322 are the combined to determine the decision that will be given under scope authorization policy 312 in response to principal 326's access request. If, for example, scope authorization policy 312 is the disjunction of policy components 314 and 316, then the results under these policy components are Boolean OR-ed together to arrive at an access decision.

Although the access decision is based on the effective policies, the access request is also evaluated under the test policies. Thus, an evaluation is also made as to whether scope authorization policy 312 would allow access if test policies 320 and 324 were in effect. For example, if test policies 320 and 324 evaluate to true and false, respectively, and if scope authorization policy 312 is the disjunction of policy components 314 and 316, then it may be determined that scope authorization policy 312 would evaluate to true (i.e., would allow access) if the test policies were the effective policies. As noted above, if this decision is different from the decision reached under the effective policy, then this difference may be logged. Moreover, as also noted above, in one example, the difference in test policies may be logged even if the actual access decision made by scope authorization policy 312 would not be different. For example, if effective policies 318 and 322 both evaluate to true, respectively, and test policies 320 and 324 evaluate to true and false, respectively, then the disjunction of the effective and test values is the same (since true OR true=true OR false=true). However, in one example, the fact may be logged that policy component 316 changed values between the effective and test policies, even if the combination of those values by scope authorization policy 312 would not result in a different access decision.

Figure 4:
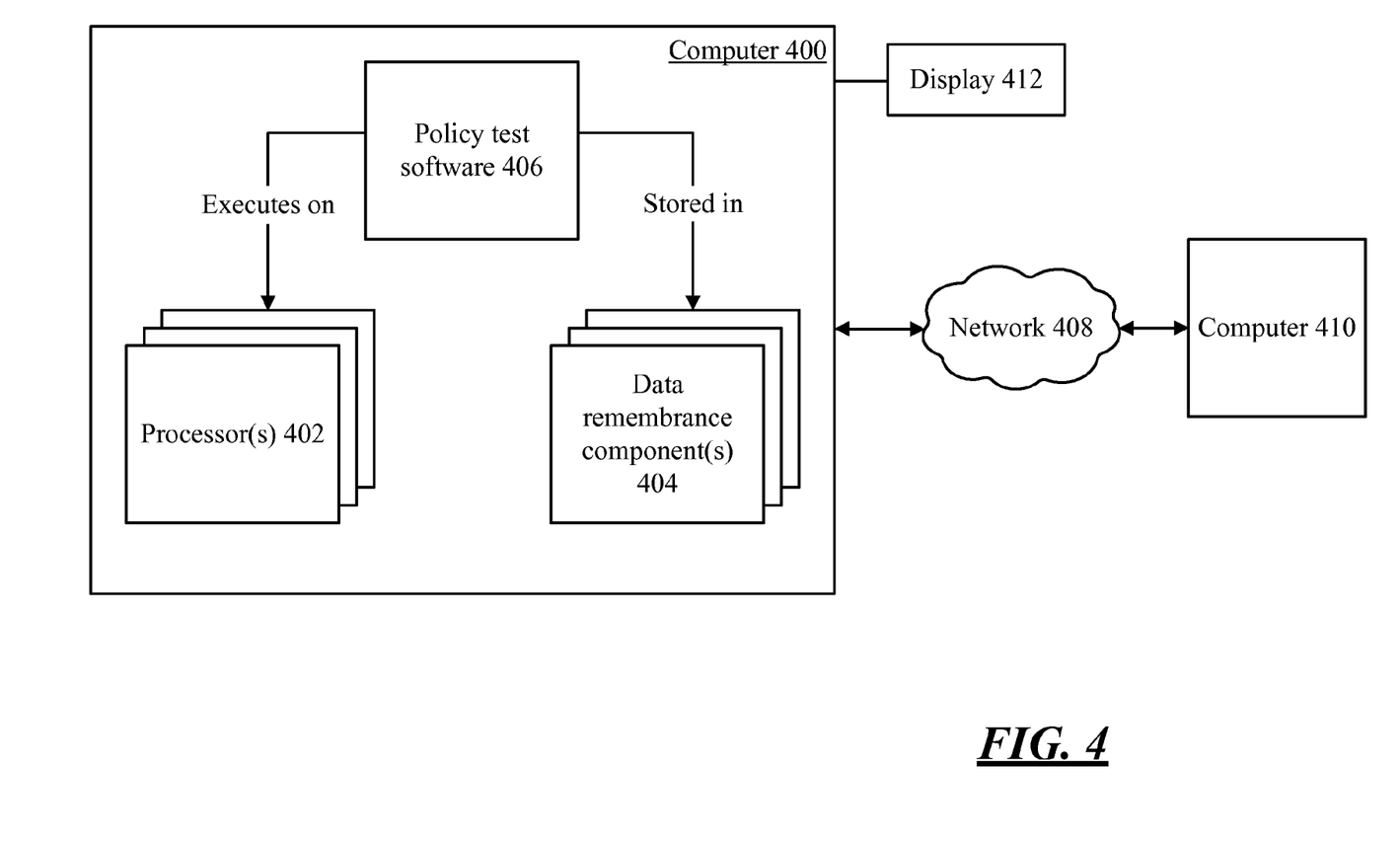
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is policy test software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Any claim that does not explicitly describe the media as "transitory" or "ephemeral" shall not be understood to describe information that exists solely a propagating signal or signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, propagating signals are not considered to be "durably" retained. Therefore, "storage media" include disks, RAMs, ROMs, etc., but does not include information that exists only in the form of a propagating signal, because such information is not "stored."

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium having executable instructions for evaluating a test policy, the executable instructions, when executed by a computer, causing the computer to perform acts comprising:
   creating a test policy;
   associating said test policy with a scope;
   receiving a request to access a resource that is within said scope;
   evaluating said request under said test policy to determine whether said request is to be allowed or denied under said test policy;
   evaluating said request under an effective policy that is associated with said scope to determine whether said request is to be allowed or denied under said effective policy;
   making a determination of whether to allow or to deny access to said resource under said effective policy but not under said test policy, said request being evaluated by one access control system under both said effective policy and said test policy even though said test policy is not used to determine whether to allow or to deny access to said resource;
   allowing or denying access to said resource based on said determination; and
   logging differences in evaluation of said request between said test policy and said effective policy.

2. The computer-readable medium of claim 1, said acts further comprising:
   determining that said request is made on one of a subset of a plurality of machines;
   performing said evaluating of said request under said test policy based on said request being made on a machine that is in said subset of machines, rather than in one of said plurality of machines that is not in said subset.

3. The computer-readable medium of claim 1, said logging comprising:
   logging up to a number of requests that evaluate differently under said test policy and said effective policy, and not logging additional requests that evaluate differently under said test policy and said effective policy after said number of requests have been logged.

4. The computer-readable medium of claim 1, said effective policy comprising a combination of a plurality of components, said test policy representing a change to one or more of said components, said acts further comprising:
   determining that a decision of whether to allow or deny said request does not change between said test policy and said effective policy;
   determining that one or more of said components changes between said test policy and said effective policy; and
   logging said request based on a fact that one or more of said components changes between said test and said effective policy even though said decision to allow or deny access does not change between said test policy and said effective policy.

5. The computer-readable medium of claim 1, said acts further comprising:
   replacing said effective policy with said test policy based on differences between said test policy and said effective policy being on one side of a threshold.

6. The computer-readable medium of claim 1, said effective policy implementing a decision as to which resources in said scope said effective policy is applicable to, said test policy representing a change in applicability relative to said test policy.

7. The computer-readable medium of claim 1, said test policy being a changed version of said effective policy.

8. A method of evaluating a test policy, the method comprising:
   using a processor to perform acts comprising:
      deploying a first policy associated with a scope;
      deploying a second policy associated with said scope, said second policy being different from said first policy;
      receiving a request to access a resource that is within said scope;
      evaluating said request under said first policy to determine whether said request is to be allowed or denied under said first policy;
      evaluating said request under said second policy to determine whether said request is to be allowed or denied under said second policy;
      making a determination of whether to allow or to deny access to said resource under said first policy, said second policy not being used to make any determinations on whether to allow or deny access to any resource, said request being evaluated by one access control system under both said first policy and said second policy even though said second policy is not used to determine whether to allow or to deny access to said resource;

allowing or denying access to said resource based on said determination; and logging differences in evaluation of said request between said first policy and said second policy.

9. The method of claim 8, said acts further comprising:

determining that said request is made on one of a subset of a plurality of machines;

performing said evaluating of said request under said second policy based on said request being made on a machine that is in said subset of machines, rather than in one of said plurality of machines that is not in said subset.

10. The method of claim 8, said logging comprising:

logging up to a number of requests that evaluate differently under said first policy and said second policy, and not logging additional requests that evaluate differently under said first policy and said second policy after said number of requests have been logged.

11. The method of claim 8, said first policy comprising a combination of a plurality of components, said second policy representing a change to one or more of said components, said acts further comprising:

determining that a decision of whether to allow or deny said request does not change between said first policy and said second policy;

determining that one or more of said components changes between said first policy and said second policy; and logging said request based on a fact that one or more of said components changes between said first policy and said second policy.

12. The method of claim 8, said acts further comprising:

replacing said first policy with said second policy based on differences between said first policy and said second policy being on one side of a threshold, said second policy beginning to be used to make any determinations on whether to allow or deny access to any resource after said first policy is replaced by said second policy.

13. The method of claim 8, said first policy implementing a decision as to which resources in said scope said first policy is applicable to, said second policy representing a change in applicability relative to said first policy.

14. The method of claim 8, said second policy being a changed version of said first policy.

15. A system for evaluating a test policy, the system comprising:

a data remembrance component;

a processor;

a guard component that is stored in said data remembrance component and that executes on said processor, said guard component receiving a request to access a resource that is within a scope associated with an effective policy and a test policy, said guard component evaluating said request under said effective policy and under said test policy, said guard component making a determination of whether to allow or deny access to said resource based on evaluation of said request under said effective policy but not based on evaluation of said request under said test policy, said guard component allowing or denying said request based on said determination, said request being evaluated by one guard under both said effective policy and said test policy even though said test policy is not used to determine whether to allow or to deny access to said resource; and a log that is stored in said data remembrance component, said guard component logging differences in evaluation of said request between said test policy and said effective policy in said log.

16. The system of claim 15, said guard determining that said request is made on one of a subset of a plurality of machines, said guard performing said evaluating of said request under said test policy based on said request being made on a machine that is in said subset of machines, rather than in one of said plurality of machines that is not in said subset.

17. The system of claim 15, said guard component logging said differences by logging up to a number of requests that evaluate differently under said test policy and said effective policy, and by not logging additional requests that evaluate differently under said test policy and said effective policy after said number of requests have been logged.

18. The system of claim 15, said effective policy comprising a combination of a plurality of components, said test policy representing a change to one or more of said components, said guard component determining that a decision of whether to allow or deny said request does not change between said test policy and said effective policy and also determining that one or more of said components changes between said test policy and said effective policy, said guard component logging said request based on a fact that one or more of said components changes between said test and said effective policy.

19. The system of claim 15, said effective policy being replaced with said test policy based on differences between said test policy and said effective policy being on one side of a threshold.

20. The system of claim 15, said effective policy implementing a decision as to which resources in said scope said effective policy is applicable to, said test policy representing a change in applicability relative to said test policy.

* * * * *